(No Model.)
J. LAIDLAW.
CENTRIFUGAL LIQUID SEPARATOR.
No. 463,058. Patented Nov. 10, 1891.
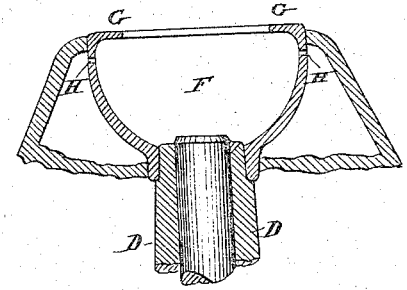
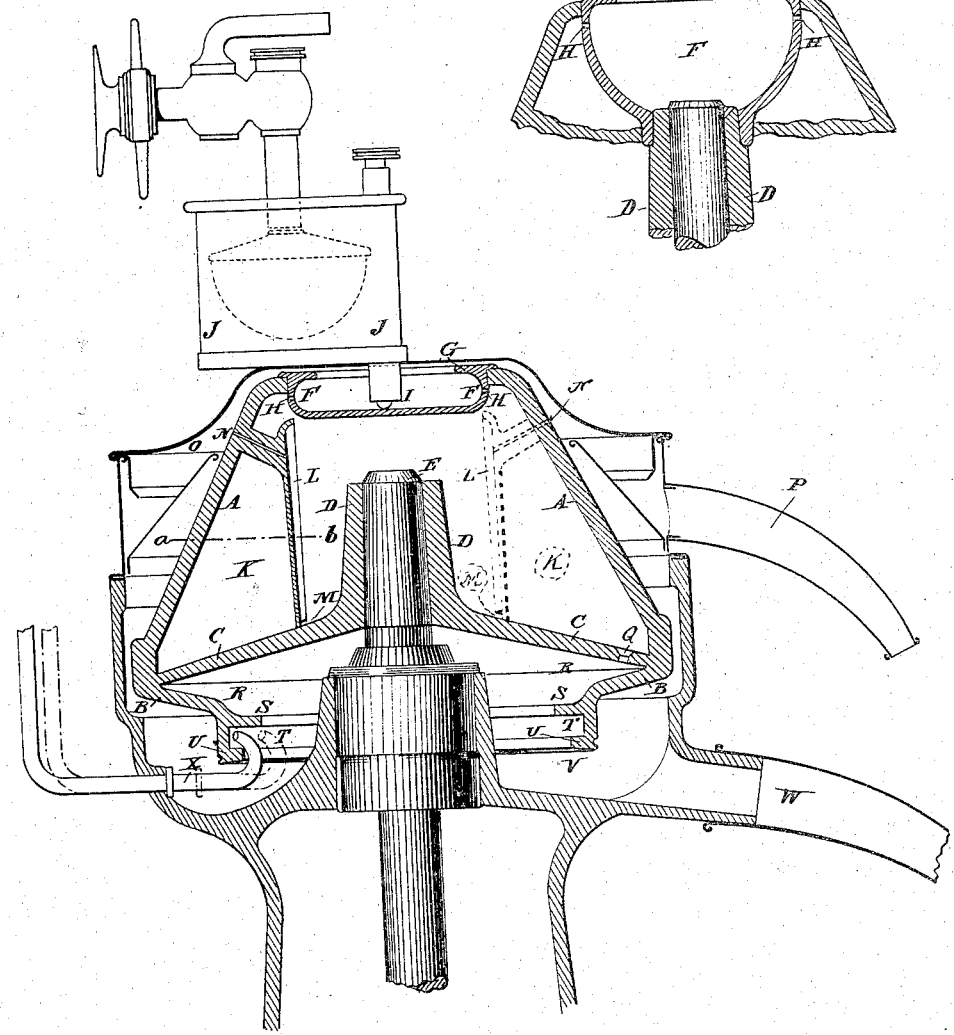
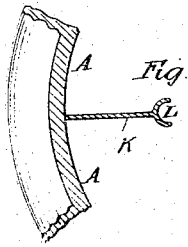
Attest:
E. Arthur
S. H. Knight
Inventor:
John Laidlaw.
by: Knight Bro.
Attys.

UNITED STATES PATENT OFFICE.

JOHN LAIDLAW, OF GLASGOW, SCOTLAND.

CENTRIFUGAL LIQUID-SEPARATOR.

SPECIFICATION forming part of Letters Patent No. 463,058, dated November 10, 1891.

Application filed July 14, 1890. Serial No. 358,626. (No model.) Patented in England December 17, 1888, No. 18,384.

*To all whom it may concern:*

Be it known that I, JOHN LAIDLAW, engineer, of the firm of Watson, Laidlaw & Co., of 98 Dundas street, Kingston, Glasgow, in the county of Lanark, North Britain, have invented Improvements in Centrifugal Machines for Separating Cream from Milk, (for which I have obtained a patent in Great Britain, No. 18,384, bearing date December 17, 1888,) of which the following is a specification.

This invention relates to improvements in centrifugal machines for separating liquids, such as cream from milk, and has for its object to render such machines more efficient than hitherto.

My improvement consists in features of novel construction hereinafter described and claimed.

In the drawings, Figure 1 is a vertical section of the separating-drum. Fig. 2 is a view of a modification of the upper part of the drum with the cup by which the milk is fed into the separating-drum. Fig. 3 is a section through line *a b*, Fig. 1, of the discharge-guide for the cream.

The drum is divided into two compartments by means of a diaphragm C. The upper part, which is marked A, is of frusto-conical shape, with the smallest part of the cone uppermost. The lower part of the drum B has an inclined face leading to the discharge-lips and forms the skim-milk collecting and discharge chambers. The central portion of the diaphragm C has a boss D, the hole in which is by preference conical to fit upon the upper conical end of the spindle E. This boss is sufficiently long to insure the separating-drum being firmly carried on the said spindle.
Within the upper part A of the separating-drum the milk-receiving cup F is carried. This cup may be carried in several ways. In Fig. 1 it is shown as carried on the upper part of the separating-drum, while in Fig. 2 it is shown as being carried on the upper part of the boss D. Whichever plan is adopted for carrying the cup the fitting between the cup and the drum must be accurately made, so that the cup and separating-drum shall revolve together and in such a manner that the cup may be removed when desired. The milk-receiving cup F is made with its largest diameter at or near the top. It has an inwardly-projecting flange G at the top, and at a small distance below this flange in the side of the cup there is a row of small holes H bored completely through the cup, making a communication between the cup and the upper part of the separating-drum. Milk is supplied by the spout I from the milk-feeding chamber J. To the spindle E is attached the gearing described in the specification of my Patent No. 409,984, A. D. 1889, by which the drum is caused to rotate very rapidly.
As the milk passes into the cup F the centrifugal force due to the rapid rotation of the cup causes the milk to rise up the side of the cup to the top and to press against the flange G. The holes H will thus be kept completely covered with a body of milk in the cup, and solid streams of milk will be forced through them into the upper part of the separating-drum without any air being allowed to pass with the milk. The centrifugal action of the separating-drum causes the milk escaping into it through the holes H to move rapidly toward the lower part, which is the part of greatest diameter, and therefore the part moving with the greatest velocity. In passing downward the milk and cream become separated, the cream coming inward toward the center and the skim-milk going outward toward the largest diameter. The cream and milk which have been separated from one another are made to flow in different directions, so as to escape from the drum for collection in the manner now to be described. The interior of the drum is fitted with one or more vanes K, which project radially from the conical side of the drum toward its center. One of these vanes is shown in section at Fig. 3. Each of these vanes is provided at its inner edge with a channel L, which is slightly inclined, so that the lower part is rather nearer the axis of the separating-drum than its upper part. There is a small space M between the lower part of each channel L and the diaphragm C. Through this space the floating cream passes to the bottom of the channel and by centrifugal action passes up the channel and escapes through the hole N into the annular collecting-chamber O, from which it is drawn off by the spout P.

The milk from which the cream has been separated and collected, as hereinbefore described, passes through a series of small holes Q, which are provided at short intervals all around the periphery of the diaphragm C, in continuous streams into the lower part of the drum R, from which it escapes over the lip of the inclined surface S into the collecting-chamber T. The milk may be taken from this chamber by being allowed to flow over its lip U into the annular receptacle V and drawn off by the spout W, or it may be caused by centrifugal action to pass into a collecting-pipe X, by which the milk may be conveyed to a receiver placed at any convenient distance. The pipe X is arranged so that the milk can be drawn away by either of these methods. When it is desired to draw away the milk by means of the pipe X, this pipe is in the position shown in full lines; but when it is desired to draw off the milk by the spout W the nozzle of the pipe is brought nearer the axis of the centrifugal machine either by sliding it into the position shown by dotted lines or by turning the nozzle around. The nozzle is thus taken out of the milk, which is allowed to flow over the lip U into the annular receptacle V.

I claim—

1. The combination, with a collecting-chamber, of a separating-drum having a vane projecting radially from the side thereof toward the center and formed at its inner edge with a slightly-inclined channel extending upwardly and with a hole extending from the upper part of the channel through the vane and through the wall of the drum, the lighter fluid by centrifugal action being caused to pass up the channel and through the hole into the collecting-chamber, substantially as described.

2. The combination, with a collecting-chamber, of a separating-drum having a vane projecting radially from the side thereof toward the center, formed at its inner edge with an upwardly-extending channel, leaving a small space at the lower part of the latter, and with a hole extending from the upper part of the channel through the vane and through the wall of the drum, the lighter fluid by centrifugal action being caused to pass up the channel and through the hole into the collecting-chamber, substantially as described.

3. The combination, with a collecting-chamber, of the separating-drum having an upper part of conical shape, a diaphragm dividing the drum into two compartments having a series of small holes around the periphery, and a vane projecting radially from the side of the drum toward the center thereof, formed at its inner edge with an upwardly-extending channel, leaving a small space at the lower part of the latter, and with a hole extending from the upper part of the channel through the vane and through the wall of the drum, substantially as described.

4. The combination of the upper collecting-chamber for the lighter fluid, the lower collecting-chamber for the heavier fluid, the drum having an upper part of conical shape, a lower part having an inclined surface provided with a discharge-lip, a diaphragm dividing the drum into two compartments having a series of small holes around the periphery, and a vane projecting radially from the side of the drum toward the center thereof, formed at its inner edge with an upwardly-extending channel, leaving a small space at the lower part of the latter, and with a hole extending from the upper part of the channel through the vane and through the wall of the drum, substantially as described.

5. The combination of the upper collecting-chamber for the lighter fluid, the lower collecting-chamber for the heavier fluid, the drum having an upper part of conical shape, a lower part having an inclined surface provided with a discharge-lip, a diaphragm dividing the drum into two compartments having a series of small holes around the periphery, a vane projecting radially from the side of the drum toward the center thereof, formed at its inner edge with an upwardly-extending channel, leaving a small space at the lower part of the latter, and with a hole extending from the upper part of the channel through the vane and through the wall of the drum, and the sliding collecting-pipe, substantially as described.

6. The combination, with a collecting-chamber, of a separating-drum having a vane projecting radially from the side thereof toward the center, and formed at its inner edge with an upwardly-extending channel and with a hole extending from the upper part of the channel through the vane and through the wall of the drum, and the receiving-cup having an inwardly-projecting flange at the top thereof, and a row of holes in the side of the cup at a short distance from the top, substantially as described.

In witness whereof I have hereunto set my hand in the presence of two witnesses.

JOHN LAIDLAW.

Witnesses:
 W. BOTTOMLEY,
 ARTHUR HARTLEY JUILE,
*Both of 154 St. Vincent Street, Glasgow.*